Jan. 18, 1944.        E. G. ETES        2,339,389
LIFT DOLLY
Filed July 14, 1941        2 Sheets-Sheet 1
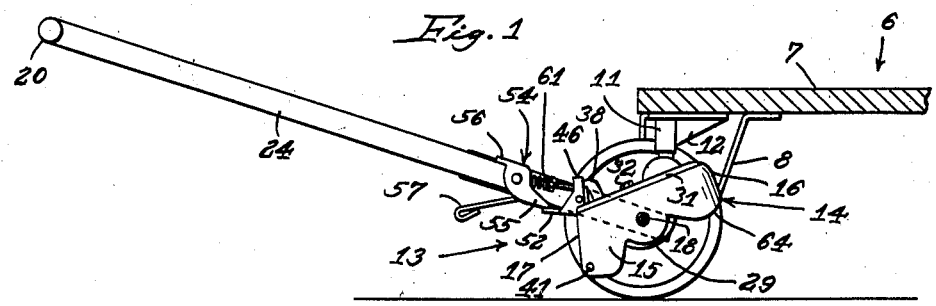
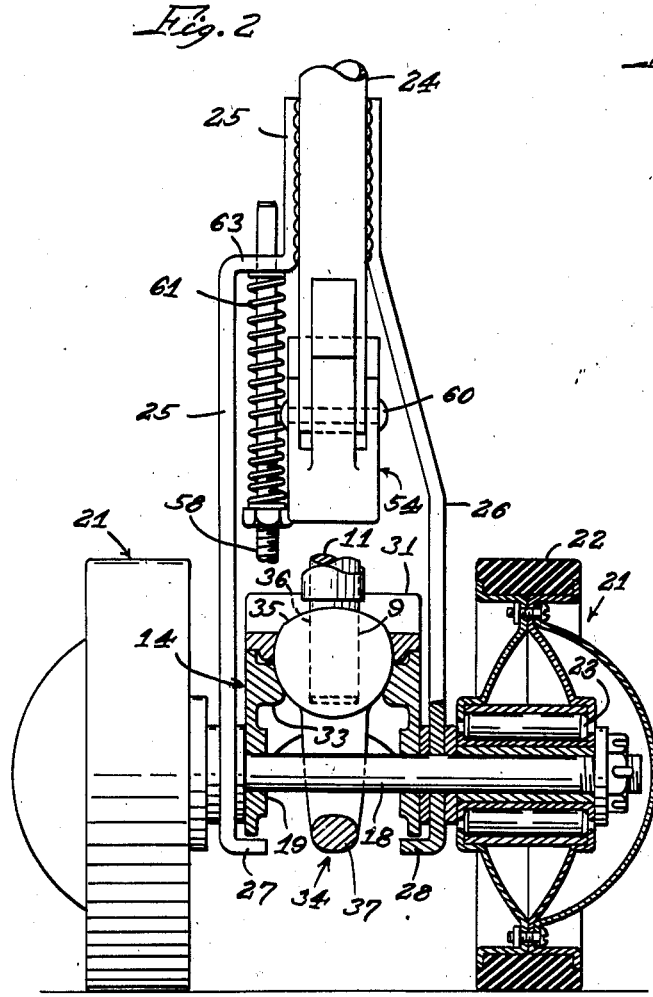
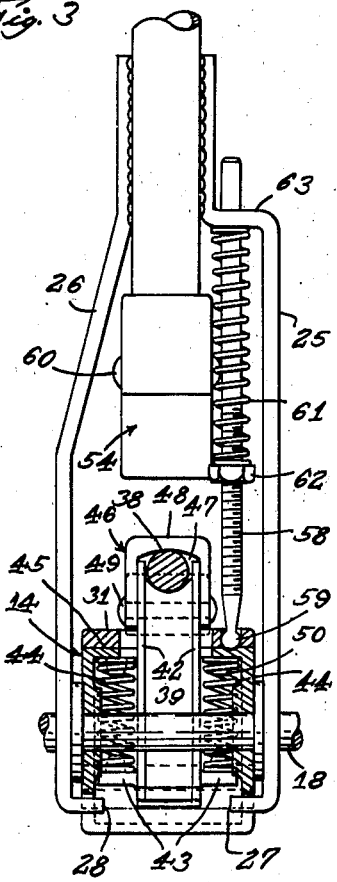
Inventor:
Elmer G. Etes
By
McCanna, Wintercorn & Morsbach
Attys.

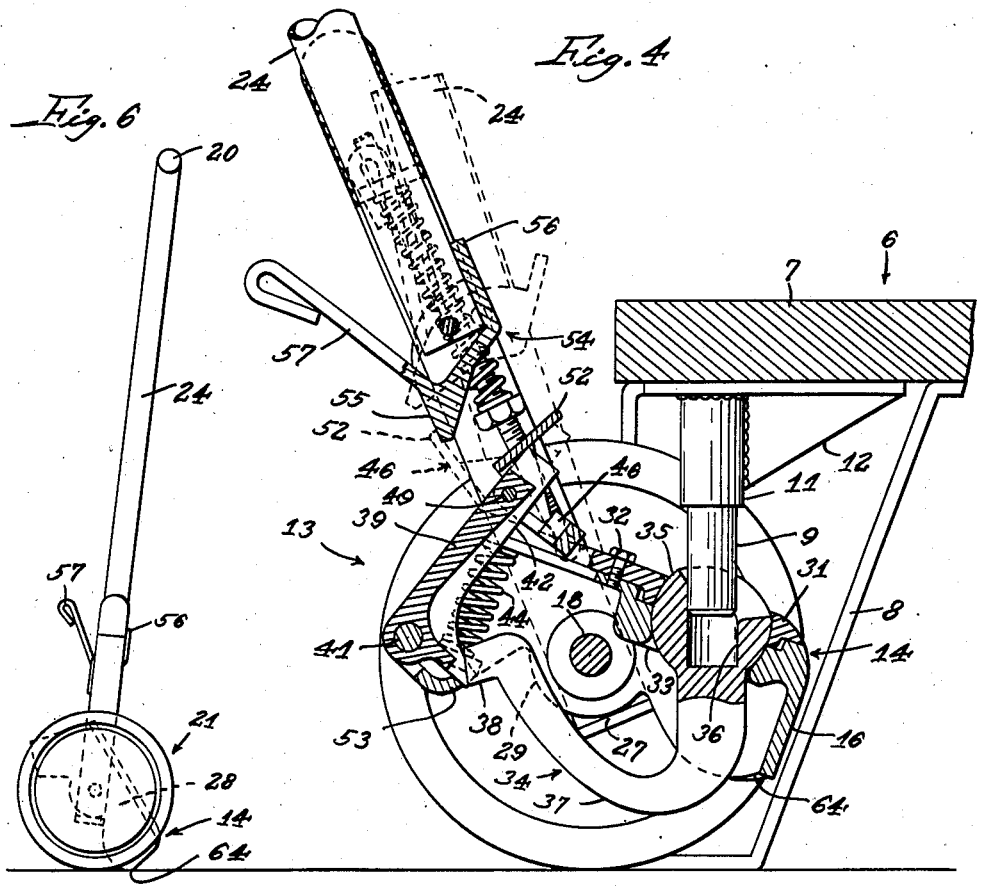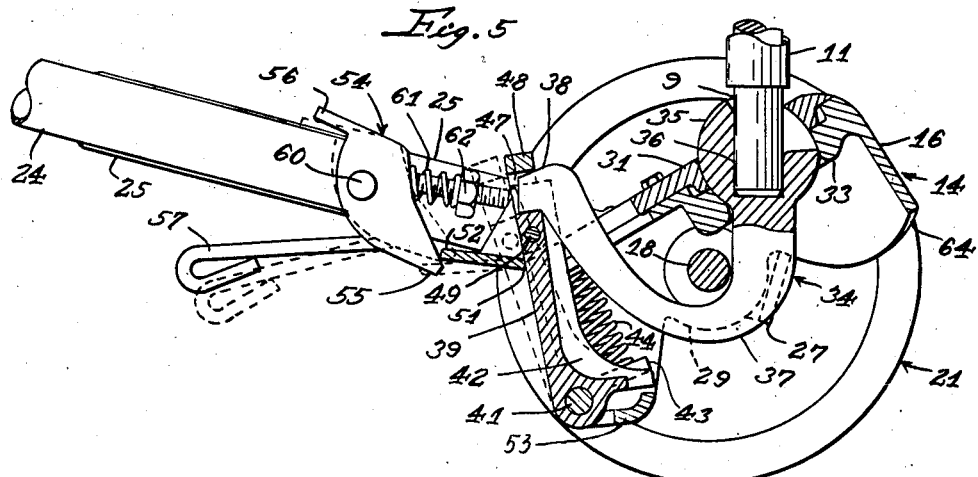

Patented Jan. 18, 1944

2,339,389

UNITED STATES PATENT OFFICE 2,339,389

LIFT DOLLY

Elmer G. Etes, Rockford, Ill.

Application July 14, 1941, Serial No. 402,368

9 Claims. (Cl. 280—46)

My invention relates to improvements in dollies, with particular reference to the type adapted for use with a skid or truck designed for handling goods and material.

The principal object of my invention is to provide a dolly, which when engaged with a device to be trucked such as a skid, will roll over an uneven floor surface or floor obstructions without causing breakage or other damage to the parts of the dolly or device attached thereto and will reduce tipping and instability of the device being trucked.

Another object of my invention is to provide a dolly of an improved and simplified design that will withstand the abuse incident to normal handling and may be easily engaged or disengaged from the trucking device through the positively-acting latch means provided.

A further object of my invention is to provide a dolly having a tongue requiring no support means to maintain it in an upright position either when the dolly is engaged to the device being trucked or when parked by itself, thereby constributing to the safety and convenience of its use.

Other objects and the improvements of my invention over prior devices will appear from the following specification and attached drawings.

Figure 1 is a side elevation of the dolly in the operative position with a skid engaged therewith;

Fig. 2 is a transverse section through the central portion of the said dolly showing a section of the rearward portion of the frame and a transverse section of one of the wheels;

Fig. 3 is a transverse section through the frame of the said dolly showing the forward or front portion thereof including the latch means;

Fig. 4 is a vertical longitudinal section through a central portion of the said dolly showing its relative position to a skid immediately before moving the dolly to the operative position;

Fig. 5 is a similar view to that shown in Fig. 4 with the dolly moved to the operative position in which it engages the pin of the skid; and Fig. 6 is a view of the dolly in a parked position in which its tongue remains in an upright position without other support means.

Figure 1 shows a skid of the conventional sort, generally designated at 6, having a rectangular platform 7 and having two rear wheels, not shown, mounted beneath each of the rear corners. The front end of the skid in its lowered position is supported by two legs 8 located inwardly from each of its front corners in spaced relation, each of the legs being formed from a single piece of strap steel whose end portions are secured to the platform 7 by means such as welding.

A depending pin 9 is mounted between the two legs 8 at the front central portion of the platform 7. The pin 9 is secured within a collar 11 which is welded to the platform 7 and is braced by a triangular member 12. The dolly, designated generally by 13, to be hereinafter described, is adapted to engage the pin 9 of the skid 6 to raise the front end thereof and truck it to the desired location, whereupon the skid 6 is lowered to rest upon its legs 8 and the dolly 13 is available for use with other skids of a similar type.

The dolly 13 includes a frame 14 preferably of a cast iron construction having a pair of side walls 15 and rear and front walls 16 and 17, respectively.

The frame 14 is rotatably mounted on an axle 18, the central portions of the side walls 15 of the frame having extra stock as at 19 (Fig. 2) to provide a bearing surface on the axle 18. A pair of wheels 21 are mounted on the stub ends of the axle 18 on either side of the frame. The wheels 21 are equipped with rubber tires 22 and roller bearings 23 in order that the dolly 13 may be moved easily and quietly over a floor surface either in the loaded or unloaded condition.

The means for rotating the frame 14 are provided through a tongue 24 having a cross bar 20 at its upper end and brackets 25 and 26 attached to the lower end thereof. The upper ends of the brackets, as is clear from Figs. 2 and 3, are secured to the lower end of the tongue 24 by means such as welding while the lower ends which are spaced in a parallel relation to clear the frame 14 are rotatably mounted on the axle 18. The extreme lower ends of the brackets 25 and 26 are bent inwardly at right angles to provide integral lugs 27 and 28, respectively. As is clear from Figure 1, the central portion of the sides 15 of the frame 14 has a lower edge 29 which is substantially an equal radial distance from the axle 18. Thus, as the tongue 24 is rotated on the axle 18 relative to the frame 14, the lugs 27 and 28 engage the extreme ends of the lower edges 29 to limit relative movement of the tongue 24 between a lower position substantially that shown in Figs. 1 and 5 and an upper position, in this instance through approximately a 60° angle.

A cover 31 of a cast construction is provided for the top of the frame 14, being secured thereto by studs 32 engaging the frame 14. As shown by Figs. 2, 4 and 5, the frame 14 has a socket portion 33 integral therewith on its top side located rearwardly of the axle 18. A rugged block generally designated by numeral 34 formed by a method, such as forging, has a ball member 35 at one end integral therewith seating within the socket 33 and retained therein by the cover 31. Through this arrangement universal movement is permitted between the ball 35 and the frame 14 in order to provide relative movement of the block 34 to the frame 14. Thus, when the skid 6 is raised by the dolly 13 to the operative position, lateral movement of the block 34 is permitted relative to the frame 14 when the dolly 13 is moved across an uneven floor space, as will be more fully described. The ball 35 contains a socket 36 adapted to receive the pin 9 from the skid 6 so that when the skid 6 is in the raised or operative position as shown in Figs. 1 and 5, no relative movement between the pin 9 and the ball 35 is permitted other than a swivel or rotary movement about the axis of the pin 9.

The central portion 37 of the block 34 is gooseneck in shape in order that it may loop under the axle 18 so that upon movement of the block 34 in a vertical plane running transversely of the axle 18 as occurs when the dolly 13 lifts the skid 6 to the raised position, the proper clearance is provided between the axle 18 and the block 34. Thus, as shown by Figs. 4 and 5, when the dolly lifts the skid 6 to the raised position, or return, the ball 35 pivots on an axis substantially parallel to that of the axle 18, causing a right angled end portion 38 of the block 34 to move through an arc in a vertical plane running transversely of the axle 18. Arcute movement of the block 34 is limited by a latch 39 pivotally mounted by a pin 41 (Figs. 4 and 5) in the lower front portion of the frame 14. The latch 39 has a groove therein formed by a pair of inwardly projecting sides 42 which provide a channel for guiding the end portion 38 of the block 34. The lower end of the latch 39 is right angled and includes a pair of inwardly projecting lugs 43 in spaced relation. As shown by Fig. 3, lugs 43 support a pair of compression springs 44 located on either side of the latch 39. At their upper ends the springs 44 are compressed against and located by abutments 45 and bosses 50, respectively, both of which are integral with the frame 14. This arrangement resiliently urges the latch to move in a clickwise direction facing Figs. 4 and 5. An L-shaped dog 46 (Fig. 3) having an opening 47 in one member 48 is pivotally mounted at its central portion by a pin 49 to a top portion of the latch 39. As shown by Figs. 4 and 5, the dog 46 rotates on its pivot pin 49 through approximately a 90° angle. The member 48 of the dog 46 is of heavy section metal and acts as a counter-weight so that normally it falls inwardly as shown by the full line position in Fig. 4, its other position being that shown by the dotted line in Fig. 4, in which position further movement in the same direction is prevented by abutment of the latch 39 and the dog 46 at the point 51, as shown in Fig. 5. Thus, when the dolly 13 is moved from the inoperative to the operative position, the end portion 38 of the block 34 rides upwardly within the channel of latch 39 whereupon it kicks over the dog 46 to its upright position, as shown by Fig. 5, and engages therewith through the opening 47. This latches the block 34 to the frame 14 so that there is no relative movement therebetween in a plane running transversely of the axle 18. It is clear, however, that the block 34 may rock laterally relative to the frame 14 so that as the dolly is moved across an uneven floor surface during which one wheel 21 is elevated more than the other, the block 34 will remain vertically disposed to prevent tipping of the skid 6 or springing or other damage to parts of the skid 6, such as to pin 9, or to parts of the mechanism in the dolly 13.

The block 34 is maintained in the latched position (shown in Fig. 5) by the springs 44 acting upon the latch 39 to maintain the same under the end portion 38. To release the block 34 the tongue 24 is lowered to release the pressure of the block on the dog and the frictional engagement of the end portion 38 of the block 34 upon the upper portion of the latch 39 and force is simultaneously exerted by a lever 54 upon the end portion 52 of the dog 46, causing the latch 39 to move in a counter-clockwise direction against the pressure of springs 44 as shown by Fig. 4, withdrawing the dog. As the tongue 24 is raised and the truck lowered, the end portion 38 of the block 34 rides downwardly in the channel of the latch 39 to its lower position abutting against a lug 53 of the frame 14. Means for releasing the dog 46 and the latch 39 automatically in response to movement of tongue 24 are provided through a lever 54 pivotally secured to the tongue 24 by a pin 60. As the tongue 24 is moved downwardly, an end portion 55 of the lever 54 is brought against the end portion 52 of the dog 46, causing the latch 39 to be rotated in a direction counter to the action of springs 44 to withdraw the latch from beneath the portion 38 of block 34. Rotation of lever 54 in one direction is limited by an integrally formed lug 56 which bears against tongue 24.

The lever 54 has an arm 57 attached in a rigid relation thereto for tripping the lever 54 so that its end portion 55 may be placed on one side or the other of the end portion 52 of the dog 46. Prior to rotating the frame 14 to move the dolly to the operative position, arm 57 is moved upwardly to the position shown in dotted lines in Fig. 4, so that the dog 46 will be swung past the end 55 of lever 54 when moved to the position of Fig. 5 in response to latching movement of the end 38. When in the operative position such as in Fig. 5, the handle 24 may be freely moved upwardly and downwardly without releasing the latch 39 unless the handle 24 is forced downwardly beyond a position such as that shown in Figure 1, to an extreme latch releasing position, causing the latch 39 and dog 46 to be disengaged from the end portion 38 of the block 34, permitting the skid 6 to be lowered and the dolly 13 to be removed upon the raising of the tongue 24.

Overcenter spring means are connected with the tongue 24 to act to control the relative position of the frame 14 to the tongue 24. This adds to the safety and convenience of my device by permitting the handle to remain unsupported in an upright position irrespective of whether the dolly 13 is attached to a skid 6 or parked by itself. These means consist of a rod 58 having a ball end portion at 59 which sets within a recess adapted therefor in the cover 31. A compression spring 61 is mounted on the upper portion of the rod 58 being compressed between a nut 62 in a shoulder 63 of the bracket 25, the upper end of the rod 58 riding within an opening in the shoulder 63. It will be noted from this arrangement that the spring means described will urge the tongue 24 in one direction of rotation or the other relative to the frame 14, depending upon which side of center of axle 18 the force imparted by the rod 58 is acting upon. For example, when the dolly 13 is supporting a skid 6 in the engaged position, the tongue 24 may be moved upwardly to an upright position and remain in this position due to the force of spring 61. Also, the handle is disposed to remain unsupported in any position in its interval of travel upon the axle 18 due to friction and the force of spring 61 acting counter to the weight of tongue 24. When the tongue 24 reaches the position as shown in Figure 1, the force of spring 61 has been transferred to the opposite side of center of the axle 18 to urge the handle rearwardly to assist in the release of the latch 39 and the dog 46 thereof. This spring pressure in itself, however, is insufficient to accomplish this release. As shown by Fig. 6, the dolly 13 when not in use may be parked in a position so that the tongue 24 will be in an upright position without support means. In this position a heel 64 of frame 14 will be resting upon the floor and the force of spring 61 acting against stop means for lugs 27 and 28 will maintain the relative position of the tongue 24 and the frame 14 in the position shown in Fig. 6 acting to restrain further relative movement therebetween.

In operation, the dolly 13 is moved under the skid 6 so that the pin 9 is disposed above the ball socket 36 as shown in Fig. 4. In this position the operator moves the arm 57 of the lever 54 in an upwardly direction, to the dotted position in Fig. 4, so that the end portion 55 thereof will not bear against the end portion 52 of the dog 46 and the dog can fall rearwardly under the weight of portion 48 to the full line position of this figure. The tongue 24 is then rotated downwardly, causing the lugs 27 and 28 to engage the frame 14 and rotate its rearward portion upwardly to receive the pin 9 in ball 35 and elevate the front end of the skid 6 from the floor until the latch engages under the end 38 locking the parts in position, thereafter the end 38 engaging and rotating portion 48 of dog 46 to rotate the dog to the full line position of Fig. 5. The skid 6 can then be trucked to the location desired by manual force applied to the tongue 24. Immediately after locking the block 34 in the operative or engaged position the tongue 24 may be moved upwardly for ease in handling in which case the lever 54 will be automatically tripped to bring the end portion 55 thereof above and out of the way of end portion 52 of dog 46, moving from the full line position of Fig. 5 to the dotted line position thereof so that the relation therebetween will be as that shown in Figure 1, in which the end portion 55 of lever 54 is disposed above the end portion 52 of dog 46, thus setting the dolly 13 up for immediate release of the skid 6. If the dolly 13 is left attached to the skid 6, the tongue 24 can be moved to an upright position and retained there unaided through the force of spring 61. If it is desired that the dolly 13 should be removed, the tongue is moved downwardly as shown in Figure 1, to cause the end portion 55 of lever 54 to bear against end portion 52 of the dog 46. This releases dog 46 and latch 39 from the end portion 38 of the block 34, permitting it to move downwardly in the channel of latch 39 as the tongue 24 is raised to lower the rear end of frame 14, making the dolly 13 available for further use with other skids or for temporary parking in an upright position, such as shown in Fig. 6.

I claim:

1. In a dolly for skid trucks, the combination of an axle, a pair of wheels mounted upon the said axle, a frame mounted thereon between said wheels and rotatable with respect thereto between operative and inoperative positions, means for manually rotating said frame between said positions, a block member mounted in the said frame having universal movement relative to the said frame, coupling means on the said block member to which a complementary coupling means may engage, latch means on said frame for engaging the said block means upon movement of said frame to the operative position to prevent movement of said block relative to the said frame in substantially a plane running transversely of the said axle but not otherwise, and means for releasing the said latch means for relative movement of said block and said frame to said inoperative position.

2. In a lift dolly for skid trucks, the combination of an axle, a pair of wheels mounted on said axle, a frame on said axle between said wheels rotatable between an inoperative truck engaging position and an operative truck towing position, a tongue for rotating said frame and for towing said truck, a ball member seated in the said frame, said ball member having limited ball joint movement in the said frame and shaped to engage complementary coupling means on said truck, latch means for engaging the said ball member upon relative movement of said frame and said member to said operative position to prevent relative return movement and to retain the truck in towing position, and means for releasing the said latch means for relative movement of said frame and said ball member to the inoperative position to lower said truck.

3. In a lift dolly for skid trucks, the combination of an axle, a pair of wheels on said axle, a frame on said axle between said wheels rotatable between an inoperative position and an operative position, a ball member supported on the said frame member rearwardly of the said axle and having limited ball joint movement in the said frame and having one element of a removable pin and sleeve connection with said truck to prevent relative angular movement when engaged, latch means for engaging the said ball member in an operative position for lifting said truck to prevent movement thereof upon relative movement of said member and said frame to return movement of said frame in a plane running transversely of the said axle but permitting relative lateral movement of the said socket and frame when the dolly is moved across an uneven floor surface, means for releasing the said latch means for relative return movement of said member and said frame to lower said truck, and means for rotating the said frame to move it between said operative and inoperative positions.

4. In a lift dolly for skid trucks, the combination of an axle, a frame mounted thereon, a pair of wheels mounted in a spaced relation on the said axle, an elongated block having an upwardly disposed rear end portion supported rearwardly in the said frame, the forward end of the said block being adapted for latched engagement in an operative position to the said frame in the forward portion thereof, the said block being adapted for movement relative to the said frame in a substantially vertical plane running transversely of the said axle, latch means including an upwardly disposed channel member pivotally mounted at its lower end in the said frame, the forward end of the said block being adapted to ride in the said channel as the frame is rotated between an inoperative and an operative position, means on the upper end of the said channel member for supporting the forward end of the said block in said operative position whereby relative movement of the said frame and block in a vertical plane traversing the said axle is prevented, and means for urging the said channel member in a direction to latch the said block, means for releasing the said latch means, coupling means on the rear end portion of the said block for engagement with a complementary coupling means on said truck, said coupling means having no relative movement to the complementary coupling means in the operative position other than swivel movement, and means for rotating the frame to move it to the operative position.

5. In a lift dolly for skid trucks, the combination of an axle, a frame mounted thereon, a pair of wheels mounted in a spaced relation on the said axle, an elongated block having a rear end supported rearwardly in the said frame and adapted for universal movement relative thereto, the forward end of the said block being adapted for latched engagement to the said frame in the forward portion thereof in an operative truck lifted position, latch means including an upwardly disposed channel member pivotally mounted at its lower end in the said frame, the forward end of the said block being adapted to ride in the said channel as the frame is rotated between a lowered inoperative and raised operative position, means on the upper end of the said channel member for supporting the forward end of the said block whereby relative movement of the said frame and block in a vertical plane traversing the said axle is prevented but lateral rocking of the said block on said frame is permitted as the dolly moves across an uneven floor, and means for urging the said channel member in a direction to latch the said block, means for releasing the said latch means, coupling means on the rear end portion of the block for engagement with complementary coupling means on said truck, said coupling means when engaged having only turning movement with respect to the complementary coupling means, and means for rotating the frame to move it to the operative position.

6. In a lift dolly for skid trucks, the combination of an axle, a frame mounted thereon, a pair of wheels mounted in a spaced relation upon the said axle, an elongated block having an upwardly disposed rear end portion supported rearwardly in the said frame, the forward end of the said block being adapted for latched engagement in an operative position to the said frame in the forward portion thereof, the said block being movable relative to the said frame in a substantially vertical plane running transversely of the said axle, latch means including an upwardly disposed channel member pivotally mounted at its lower end in the said frame, the forward end of the said block being shaped to ride upwardly in the said channel as the frame is rotated from a lowered inoperative to a raised operative position, a dog pivotally mounted on the top portion of the said channel member for receiving the forward end of the said block in the latched position, a tongue having its lower end rotatably mounted on the said axle, means on the said tongue for releasing the said latch means, coupling means on the rear end portion of the said block for engagement with complementary coupling means on said truck, said coupling means when engaged being capable only of vertical or turning movement with respect to the said complementary coupling means, and means on the said frame and tongue whereby the said frame may be rotated to the operative position by movement of the said tongue.

7. In a lift dolly for skid trucks, the combination of an axle, a frame mounted thereon, a pair of wheels on said axle, an elongated block having its rear end supported rearwardly in the said frame and adapted for universal movement relative thereto, the forward end of the said block being adapted for latched engagement to the said frame in the forward portion thereof when in an operative position, latch means including an upwardly disposed channel member pivotally mounted at the lower end of said frame, the said end of the said block being adapted to ride in the said channel as the frame is rotated between an inoperative and an operative position, a dog pivotally mounted on the upper end of the said channel member for receiving the forward end of the said block whereby relative movement of the said frame and block in a vertical plane traversing the said axle is prevented but longitudinal rotation of the forward end of the said block is permitted as the dolly moves across an uneven floor, a tongue on said axle arranged for rotation with respect to the axle and said frame, means on the said tongue for releasing the said latch means, coupling means on the rear end portion of the said block for engagement with complementary coupling means on said truck, said coupling means having when engaged only turning movement with respect to said complementary coupling means, and stop means on the said frame engageable by said tongue to rotate said frame between said positions.

8. In a lift dolly for skid trucks and the like, the combination of an axle, a frame mounted thereon, a pair of wheels mounted in a spaced relation upon the said axle, a block member mounted in the said frame, coupling means on the said block member for engagement with complementary coupling means on said truck, said coupling means when engaged having only turning movement with respect to said complementary coupling means, latch means for engaging said block means in an operative position to prevent movement thereof in substantially a plane running transversely of said axle, means for releasing said latch means, tongue means for lifting and towing said truck having lost motion connection with said frame to permit relative movement of the tongue means with respect to the frame during towing, and overcenter compression spring means operative between the said frame and said tongue positioned for passage of the tongue means past the compression center line during said relative lost motion movement for supporting said tongue in an upright position when the dolly is in the operative position.

9. In a lift dolly for skid trucks and the like, the combination of an axle, a frame mounted thereon, a pair of wheels mounted in spaced relation upon the said axle, a block member mounted in said frame, coupling means on said block member for engagement with complementary coupling means on said truck, said coupling means when engaged having no relative angular movement with respect to said complementary coupling means, latch means for engaging said block means in response to rotation of said frame to an operative position to prevent return movement thereof, means for releasing the said latch means, tongue means for rotating said frame and towing said truck having its lower end rotatably mounted on the said axle and having lost motion connection with said frame to permit relative limited lost motion movement of the tongue means with respect to the frame, overcenter compression spring means operative between said tongue means and said frame positioned for the passage of the tongue means upwardly past the compression center line of said spring means during said relative movement of said tongue means to one end of said lost motion movement to support said tongue in a substantially upright position when the said frame is in an operative truck supporting position, and for passage of the tongue means downwardly past the compression center line of said spring means during relative movement of said tongue means and said frame to the opposite end of said lost motion movement and cause said tongue means and frame to rotate as a unit on said axle to permit the parking of the said dolly in an inoperative position with said tongue means and frame in upright balanced position against the floor.

ELMER G. ETES.